(12) United States Patent
Erdmann et al.

(10) Patent No.: US 9,872,131 B2
(45) Date of Patent: Jan. 16, 2018

(54) TRANSMISSION MODE SELECTION OF A ZIGBEE GREEN POWER DEVICE

(71) Applicant: PHILIPS LIGHTING HOLDING B.V., Eindhoven (NL)

(72) Inventors: Bozena Erdmann, Aachen (DE); Koen Johanna Guillaume Holtman, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/317,452

(22) PCT Filed: Jun. 12, 2015

(86) PCT No.: PCT/EP2015/063110
§ 371 (c)(1),
(2) Date: Dec. 9, 2016

(87) PCT Pub. No.: WO2015/189358
PCT Pub. Date: Dec. 17, 2015

(65) Prior Publication Data
US 2017/0127221 A1    May 4, 2017

(30) Foreign Application Priority Data

Jun. 13, 2014 (EP) .................................... 14172362

(51) Int. Cl.
*H04B 7/00* (2006.01)
*H04W 4/00* (2009.01)
(Continued)

(52) U.S. Cl.
CPC ............ *H04W 4/008* (2013.01); *H04W 84/18* (2013.01); *H04W 88/182* (2013.01)

(58) Field of Classification Search
CPC .... H04W 4/008; H04W 84/18; H04W 88/182
See application file for complete search history.

(56) References Cited

U.S. PATENT DOCUMENTS

| 2010/0309899 | A1* | 12/2010 | Aso ......................... | H04L 47/36 370/338 |
| 2015/0296551 | A1* | 10/2015 | Kim ...................... | H04W 60/00 455/426.1 |
| 2016/0277278 | A1* | 9/2016 | Wilhelmsson ........ | H04W 4/008 |

FOREIGN PATENT DOCUMENTS

WO    2013121325 A2    8/2013

OTHER PUBLICATIONS

"Introducing Zigbee Pro's New Eco-Friendly Green Power Feature", Jan. 22, 2013, X055163733, http://zigbee.or/zigbee-for-developers/network-specifications/zigbeepro.

* cited by examiner

*Primary Examiner* — Xin Jia

(57) ABSTRACT

This invention relates to a method for transmitting a message to a wireless device, the wireless device comprising a set of at least two distinct logical entities, the wireless device being arranged for receiving a message during discontinuous reception opportunities, the method comprising, prior to transmission of the message, the steps of (a) selecting a transmission mode from a set of transmission modes comprising a first transmission mode and a second transmission mode, where, in the first transmission mode, the reception opportunities for the message are limited to the reception opportunities that are associated with a single selected logical entity of the set of at least two logical entities, and in the second transmission mode, the reception opportunities for the message correspond to combined reception opportunities associated with at least two logical entities; and (b) causing the transmission of the message during one of the reception opportunities corresponding to the selected transmission mode.

13 Claims, 6 Drawing Sheets

(51) Int. Cl.
*H04W 84/18* (2009.01)
*H04W 88/18* (2009.01)

TRANSMISSION MODE SELECTION OF A ZIGBEE GREEN POWER DEVICE

CROSS-REFERENCE TO PRIOR APPLICATIONS

This application is the U.S. National Phase application under 35 U.S.C. §371 of International Application No. PCT/EP2015/063110, filed on Jun. 12, 2015, which claims the benefit of European Patent Application No. 14172362.7, filed on Jun. 13, 2014. These applications are hereby incorporated by reference herein.

FIELD OF THE INVENTION

The present invention relates to the field of wireless mesh networks, and devices configured therefor. This invention relates more specifically to the communication of a message to a device including a plurality of logical entities, and is, for example, relevant for (but not limited to) a wireless network like a ZigBee network, which comprises a resource restricted device, for example a ZigBee Green Power Device.

BACKGROUND OF THE INVENTION

Home automation requires several devices to communicate one with another to enable the user to control and command apparatuses, including luminaires, air conditioners. Devices like switches, light sensors, temperature sensors are controllers that are used to send commands to the controlled devices. Energy-harvesting controllers are an appealing option for the controls market. Indeed, these can be powered by the energy harvested from their environment (e.g. incident light, temperature difference or flow) or human action (e.g. button press), and thus autonomously operating, maintenance-free (no batteries need to be replaced) and have a "green appeal".

One of the typical controls use cases, realized today with mains- and battery-powered wired or wireless controllers, is a multiple-rocker/multi-button controller (or switch/remote), allowing each of the rockers/buttons to control separate targets (actuator(s)), e.g. to control window side and corridor side lights of a room separately. This is illustrated by the exemplary FIG. 1, where a device 1 comprises two rockers 11 and 12 that control respectively at least one lamp 13 and 14 via on and off commands. It is to be noted that the number of rockers could be higher. Further, instead of a switch, the device could also include a light sensor or a motion detector. In fact, it does not only cover other user-actuation means (e.g. knobs, sliders, touchpads, etc.), but also multiple instances of autonomously operated devices, e.g. sensors, which may be triggered e.g. by a timer, the measured value passing a particular threshold, a particular amount of harvested energy, etc. However, for cost reduction reasons, it is envisaged to have only one wireless transceiver for the multiple different rockers/sensors each of which forms a distinct logical entity among multiple logical entities.

The Green Power feature of the ZigBee specification is currently the only standard for energy-harvesting wireless devices. It targets the full spectrum of energy-harvesting devices, from very simple ones just able to deliver a limited set of commands, to locally commissionable ones able to use security, to ones capable of bidirectional communication, i.e. remotely manageable. The Green Power Device (GPD) vendors can select the set of features required by their application—and possible with the energy source foreseen for their product.

The bidirectional communication feature of Green Power, i.e. the capability of sending a frame to (and receiving the frame by) the GPD, is tailored to the limited energy-resources of the Green Power Device. The GPD supporting the feature can, under application control, open a reception window for a short period of time after its own transmission (in the current GP specification v1.0, the gpRxOffset, defining the time between the start of the GPD's transmission and the start of the GPD's reception window, is 5 ms).

To make it possible, the devices communicating to the GPD have to behave as follows. The command to be delivered to the GPD needs to be buffered, in order to be ready for the GPD transmission. The Green Power specification defines the gpTxQueue for that purpose. Since the reception opportunities by the GPD may be scarce, despite the short time interval of gpRxOffset, the frame must be delivered securely; i.e. the device transmitting to the GPD has to verify that the received trigger frame is formatted correctly and protected according to the prior agreement with the GPD, and then security process the to be sent frame.

However, in the case of a single device with multiple logical entities like the device of FIG. 1, there is a need for adapting the addressing and communication schemes to enable an efficient and flexible communication. The same problem may occur with non ZigBee Green power devices, for example proprietary solutions.

SUMMARY OF THE INVENTION

It is an object of the invention to propose a method for operating a node which alleviates the above mentioned problems.

It is another object of the invention to propose a method for transmitting a message to a wireless device which efficiently deals with the transmission of messages addressed to different logical entities of the same wireless device.

To this end, it is proposed in accordance with a first aspect of the invention a method for transmitting a message to a wireless device,
the wireless device comprising a set of at least two distinct logical entities, the wireless device being arranged for receiving a message during discontinuous reception opportunities, the method comprising, prior to transmission of the message, the steps of
(a) selecting a transmission mode from a set of transmission modes comprising a first transmission mode and a second transmission mode, where,
in the first transmission mode, the reception opportunities for the message are limited to the reception opportunities that are associated with a single selected logical entity of the set of at least two logical entities, and
in the second transmission mode, the reception opportunities for the message correspond to combined reception opportunities associated with at least two logical entities; and
(b) causing the transmission of the message during one of the reception opportunities corresponding to the selected transmission mode.

Thus, this scheme first allows the handling of the transmission of messages to different logical entities. But moreover, it offers the choice of two different transmission modes, where the second one enables a faster transmission of the message to the wireless device. Indeed, in case the reception opportunities associated with a first logical entity are occurring less often than reception opportunities associated with a second logical entity, a critical message can nevertheless be sent to the first logical entity of the wireless device by using any of the reception opportunities associated with the first or the second logical entities. For example, a configuration message which can be critical for the operation of the wireless device can be sent more easily.

This invention can be beneficial for any devices with logical entities having different associated reception opportunities. However, it is particularly interesting for the use of restricted wireless devices, for example energy harvesting wireless devices which can only communicate when they have harvested sufficient energy. For example, the wireless device can comprise an energy harvester with at least one energy input for the energy harvester, wherein a reception opportunity occurs at a predetermined time instant after a transmission period, said transmission period being triggered at least in part by the harvesting of energy through said energy input. The energy input can be for example a rocker or a button which actuates a small dynamo, movement of a magnet with respect to a coil or piezoelectric harvester for collecting energy from the mechanical actuation by the user. In particular, the energy input can be associated with a corresponding logical entity, and the transmission period and the subsequent reception opportunity are associated with said logical entity. Thus, in an example, a wireless device has two different rockers with respective energy inputs for the energy harvester corresponding each to a respective logical entity. There can be a single harvester actuated by both inputs or two different harvesters, each one corresponding to a rocker. If one of the rockers is used less often than the other, the corresponding logical entity has only few transmissions and thus only a few associated reception opportunities. This means that it might be difficult to pass messages through to or that logical entity. This variant of the invention solves this issue.

In accordance with a first embodiment of this first aspect of the invention, steps (a) and (b) are carried out at a message source, wherein step (b) further comprises the message source sending a control message including an indicator to a dedicated proxy node dedicated to at least one logical entity of the set of logical entities, wherein the value of the indicator is set in accordance with the selected transmission mode, the method further comprising step (c) of the dedicated proxy node transmitting the message during one of the reception opportunities corresponding to the selected transmission mode.

In an example of this first embodiment, if the message source is the dedicated proxy node, the sending of step (b) comprises sending the control message to a lower layer causing the transmission of the message at step (c) by the message source as the dedicated proxy node. In another example of this first embodiment, the indicator is a logical entity identifier included in a logical entity identifier field of the control message to the dedicated proxy node, and wherein, if the first transmission mode is selected, the value of the indicator is equal to the logical entity identifier of the single selected logical entity, and wherein, if the second transmission mode is selected, the value of the indicator is a reserved predetermined identifier. The term reserved is used in a similar manner as standard specification which means that these values have a special meaning. This embodiment can be realized with the already defined logical entity identifier field. In another example which may be combined with the preceding one, the indicator is contained in a flag field carried in addition to the logical entity identifier field including a logical entity identifier. Thus, the logical entity identifier may be used to specify to which logical entity the message is addressed (if the identifier is not a reserved value), and which transmission mode is to be used can be specified with the flag field. This allows more flexibility to the transmission schemes. Moreover, if a special (reserved or wildcard) value is included in the logical entity identifier, this can be used to indicate special handling of the message as will be explained in more detail hereafter.

In a further variant of the first embodiment, in the second transmission mode, the reception opportunities for the message correspond to the combined reception opportunities of all the logical entities of the wireless device. This thus offers the possibility of a significant increase in the amount of reception opportunities available for transmission when the second transmission mode is selected.

In accordance with a further variant of the invention, in step (a) regarding the selection of the transmission mode, this selection also includes the selection of a dedicated proxy node to carry out step (c) of transmitting the message to the wireless device. Thus, when the transmission mode is selected, the node can also select a proxy node which will carry out the transmission. Thus, the message source can select for example based on the quality or reliability of transmission or frequency of transmission of a particular logical endpoint via a particular proxy.

In still another variant of this first aspect of the invention which can be combined with the previous variants, the selection of the transmission mode is based on one or multiple of the following criteria: characteristics of the wireless device, number of logical entities on the wireless device, type of wireless device, frequency of communication of logical entities, type of communicated information, urgency of delivery of the communicated information, a need for any sort of confirmation by the wireless device, applicability of the communicated information to one or more logical entities of the wireless device or entire wireless device, desired reliability of the delivery, creating one or multiple message to be delivered, characteristics of the source node, source node type, source node ability to be a proxy, exactness of knowledge about proxies, delivery success rate of previous transmissions, a relation between the transmission modes, a number of source nodes paired to or communicating to a particular logical entity, a relation between the transmission modes, handling instructions related to the transmission modes.

In a further variant of the first aspect of the invention which can be combined with the previous variants, the method further includes the step (c) of a proxy node transmitting the message during one of the reception opportunities corresponding to the selected transmission mode. Further, in step (b), reception of the control message with a transmission mode indicator includes a step of selecting a handling instruction related to the handling of buffered messages in a transmission buffer of the proxy node based at least in part on the transmission mode indicator. This handling instruction is an indication of some actions on the messages buffered on the proxy node and not yet transmitted, as well as the message just supplied by the source, especially when they are addressed to the same wireless device. Based at least in part on the transmission mode of the buffered, if any, and supplied message, as well as the selected logical entity and the wireless device identifier of both messages, the proxy node can take a decision to add a message to a transmission queue, to remove a message from the queue, to replace the message, or even to retain a message. The handling instructions can be fixed (e.g. message of second transmission mode always replacing a message of first transmission mode addressed to the same wireless device) or based on the current status of the proxy; further arbitration rules are described below. The handling instructions can be an autonomous decision of each individual proxy or require communication in the network. A message source can select the transmission mode taking into account the handling instructions related to it.

In accordance with a second aspect of the invention, it is proposed a method of forwarding a message from a proxy node device to a wireless device, the wireless device comprising a set of at least two distinct logical entities, the wireless device being arranged for receiving messages during discontinuous reception opportunities, the method comprising, the steps of, at the proxy node device, (a) detecting a value of an indicator in a control message indicative of a selected transmission mode selected from a set of transmission modes comprising a first transmission mode and a second transmission mode, (b) generating a message to be sent to the wireless device from the control message, (c) transmitting the message to the wireless device based on the detected transmission mode, where, in the first transmission mode, the reception opportunities for the message are limited to the reception opportunities associated with a single selected logical entity of the set of at least two logical entities, and in the second transmission mode, the reception opportunities for the message correspond to combined reception opportunities associated with at least two logical entities.

In a variant of this embodiment, the control message further comprises a logical entity identifier field including a logical entity identifier, wherein if the logical entity identifier identifies one identified logical entity of the set, the first transmission mode is detected, and the selected single logical identifier is the identified logical entity, and wherein if the logical entity identifier field carries a reserved address, the second transmission mode detected.

In another variant which can be combined with the previous one, the proxy node comprises a proxy table storing information regarding the wireless device, where a single proxy table entry denotes the set of at least two logical entities of the wireless device.

In another variant of this aspect, the indicator includes a handling instruction related to the handling of buffered messages in a transmission buffer of the proxy node based at least in part on the transmission mode indicator. This handling instruction may request the proxy node to replace a buffered message by another or to retain a buffered message, adding the new message in front in the queue or the like. This enables to have some control on the transmission of the proxy nodes, and thus avoiding for example simultaneous transmissions which would collide, and are likely to be both incorrectly received by the wireless device.

It is to be noted that for all these aspects, the wireless device may comprise at least one energy input for an energy harvester, wherein a reception opportunity occurs at a predetermined time instant after a transmission period, said transmission period being triggered at least in part by the harvesting of energy through said energy input. Further, in an example, said energy input is associated with a logical entity, and wherein said transmission period being triggered at least in part by the harvesting of energy through said energy input and said reception opportunities are associated with said logical entity.

In a further variant of the first and second aspects of the invention, the proxy node or the message source comprises a table storing information regarding the wireless device, where a single table entry denotes a number of logical entities of the wireless device, wherein the number is selected by the proxy node or the message source between 1 and the number of logical entities the wireless device. This enables a flexibility at the message source or the proxy node to store in a single entry data relevant for a plurality of logical entities of the wireless device if required. Thus, it is possible to keep a compact form for the tables.

In accordance with a third aspect of the invention, it is proposed a message source apparatus for causing the transmission of a message to a wireless device comprising a set of at least two distinct logical entities, the wireless device being arranged for receiving a message during discontinuous reception opportunities, the message source apparatus comprising a controller adapted to select a transmission mode from a set of transmission modes comprising a first transmission mode and a second transmission mode, where, in the first transmission mode, the reception opportunities for the message are limited to the reception opportunities that are associated with a single selected logical entity of the set of at least two logical entities, and in the second transmission mode, the reception opportunities for the message correspond to combined reception opportunities associated with at least two logical entities;

said controller being adapted to cause the transmission of the message during one of the reception opportunities corresponding to the selected transmission mode.

In accordance with a fourth aspect of the invention, it is proposed a proxy node comprising a transceiver for forwarding a message to a wireless device comprising a set of at least two distinct logical entities, the wireless device being arranged for receiving messages during discontinuous reception opportunities, the proxy node comprising a decoder adapted to detect a value of an indicator in a control message indicative of a selected transmission mode selected from a set of transmission modes comprising a first transmission mode and a second transmission mode, a controller adapted to generated a message to be sent to the wireless device from the control message, wherein the transceiver comprises a transmitter adapted to transmit the message to the wireless device based on the detected transmission mode, where, in the first transmission mode, the reception opportunities for the message are limited to the reception opportunities associated with a single selected logical entity of the set of at least two logical entities, and in the second transmission mode, the reception opportunities for the message correspond to combined reception opportunities associated with at least two logical entities.

In accordance with a fifth aspect of the invention, it is proposed a method for transmitting a message to a wireless device, the wireless device being arranged for receiving a message during discontinuous reception opportunities, the method comprising, prior to transmission of the message, the steps of (a) selecting a transmission mode from a set of transmission modes comprising a first transmission mode and a second transmission mode based on the assumption that the wireless device comprises a set of at least two distinct logical entities, where, in the first transmission mode, the reception opportunities for the message are limited to the reception opportunities that are associated with a single selected logical entity of the set of at least two logical entities, and in the second transmission mode, the reception opportunities for the message correspond to combined reception opportunities associated with at least two logical entities;

and (b) causing the transmission of the message during one of the reception opportunities corresponding to the selected transmission mode.

As explained above, the message source decides how to utilize the different logical entities to deliver the message to a wireless device, for example a GPD via a proxy node, for example a TempMaster. The message source can be a sink paired with the wireless device. The message source can also be some intelligence, e.g. a commissioning tool used at network setup time to obtain the information on and provide the network configuration to the wireless device, or a management device, e.g. responsible for updating the network operational parameters or application parameters during operation. The wireless device is, for example, a Green Power Device (GPD), sending commands to be executed by the sink.

(i) The message source can decide to deliver the message on communication from a single specified logical entity only.

(ii) The message source can also decide to deliver upon any communication (from any logical entities) from this GPD.

(iii) The message source can decide to deliver the message multiple times, on communication from each selected logical entity.

(iv) The decision can be indicated via an indicator.

This solution has a number of advantages: (i) it allows the source to choose for fastest-possible delivery, for example if the message to be transmitted is critical (configuration change) or if there is a large inequity between reception opportunities corresponding to a logical entity and the others; (ii) it allows the message source to save the processing resources on the candidate TempMasters, since only frames related to a selected transmission mode need to be handled, esp. security-processed; (iii) it also allows the source(s) to benefit from buffer space for multiple frames to a particular GPD (for example if each is addressed to another logical entity); (iv) it allows the intelligence to influence the reliability of message delivery to the GPD (by choosing multiple TempMasters for delivering multiple copies of the same message via different endpoints), esp. for endpoints with different or unpredictable usage frequency, or for urgent updates (v) allows the intelligence to limit the message delivery impact on the network traffic, esp. in the case of dense networks and GPDs with very many endpoints, by limiting the number of copies of a particular message.

It is to be noted that another aspect of the invention is computer program product comprising a code which, when run on a computer, causes the computer to carry out the steps of the method of the first aspect or of the second aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION

Figure 1:
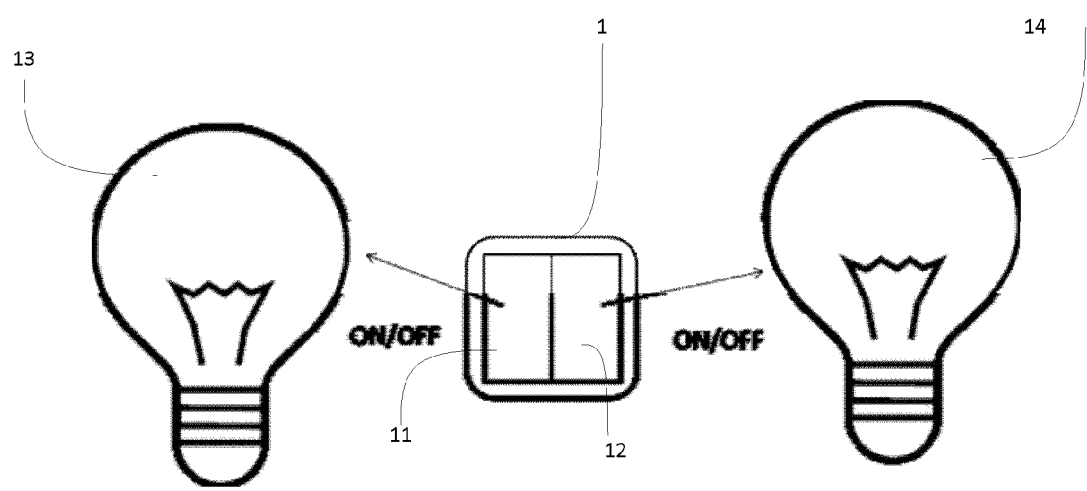
FIG. 1, already described, shows a wireless device in which an embodiment of the invention is implemented.
Figure 2:
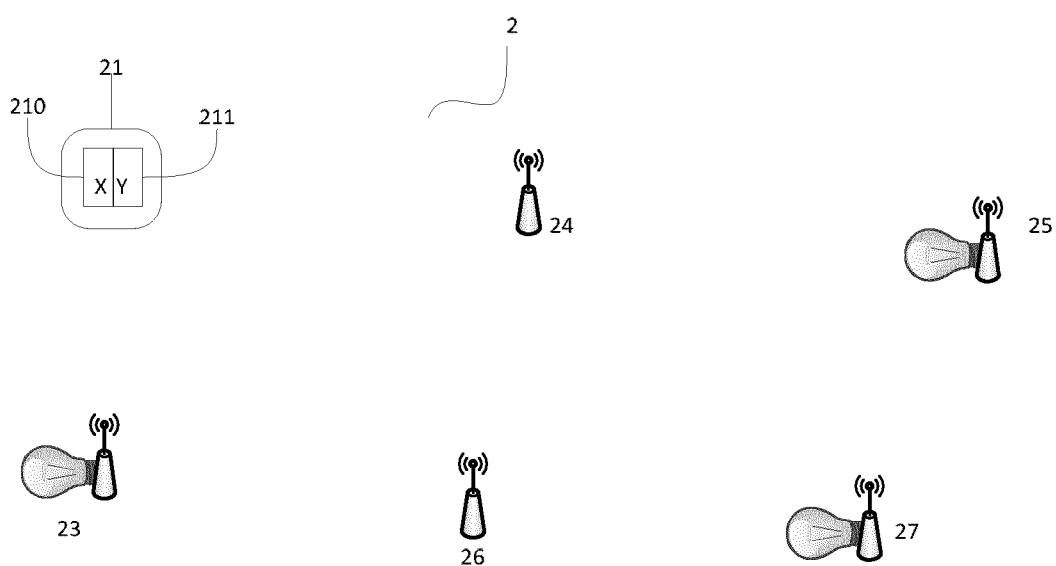
FIG. 2 is a diagram of a network in which the an embodiment of the invention is implemented.

Embodiments of this invention will now be shown with reference to the figures. In accordance with a first embodiment of the invention, a method for communicating a message is implemented in a network 2 as shown in FIG. 2. This first embodiment will be explained with reference to a ZigBee mesh network, however, this embodiment, like any of the other embodiments of the invention could also be implemented in a non-ZigBee environment, for example based on a proprietary solution. This network 2 is for example a ZigBee mesh network where at least some of the nodes are compatible with the ZigBee Green Power specifications. Network 2 is a mesh network and comprises a plurality of interconnected devices 21, 23, 24, 25, 26 and 27. In the example of network 2, a wireless device 21 comprises, like in the example of FIG. 1, two buttons of which each can control a distinct set of luminaires driven by node devices. In this example, the button 210 controls the luminaire driven by the node 23, the button 211 controls the luminaire driven by the node 25. For the sake of clarity, only one luminaire is assigned to each set controlled by the buttons, however, a set could include a list or a group of luminaires (or other actuators). To control a luminaire, when a user actuates a button, the wireless device 21 sends commands in the network, which may be forwarded if the destination nodes are not within the radio range of the wireless device 21.

The wireless device 21 will now be explained in greater detail with reference to FIG. 3. On the example of FIG. 3, the wireless device 21 is a resource-restricted device, for example an energy-harvesting device, i.e. a device which obtains its energy from its environment. A resource restricted device in the sense of this patent application is a node which is operating with very low power and may even have no power storage. It may be for example a ZigBee Green Power Device (also referred to by GPD). This kind of device may be able to transmit or receive only at some opportunities, for example after harvesting energy from the environment (e.g. in case of a light detector using the solar power to operate) or from the actuation by a user (e.g. in case of a battery less switch). Such reception opportunities can thus not always be scheduled in advance.

Figure 3:
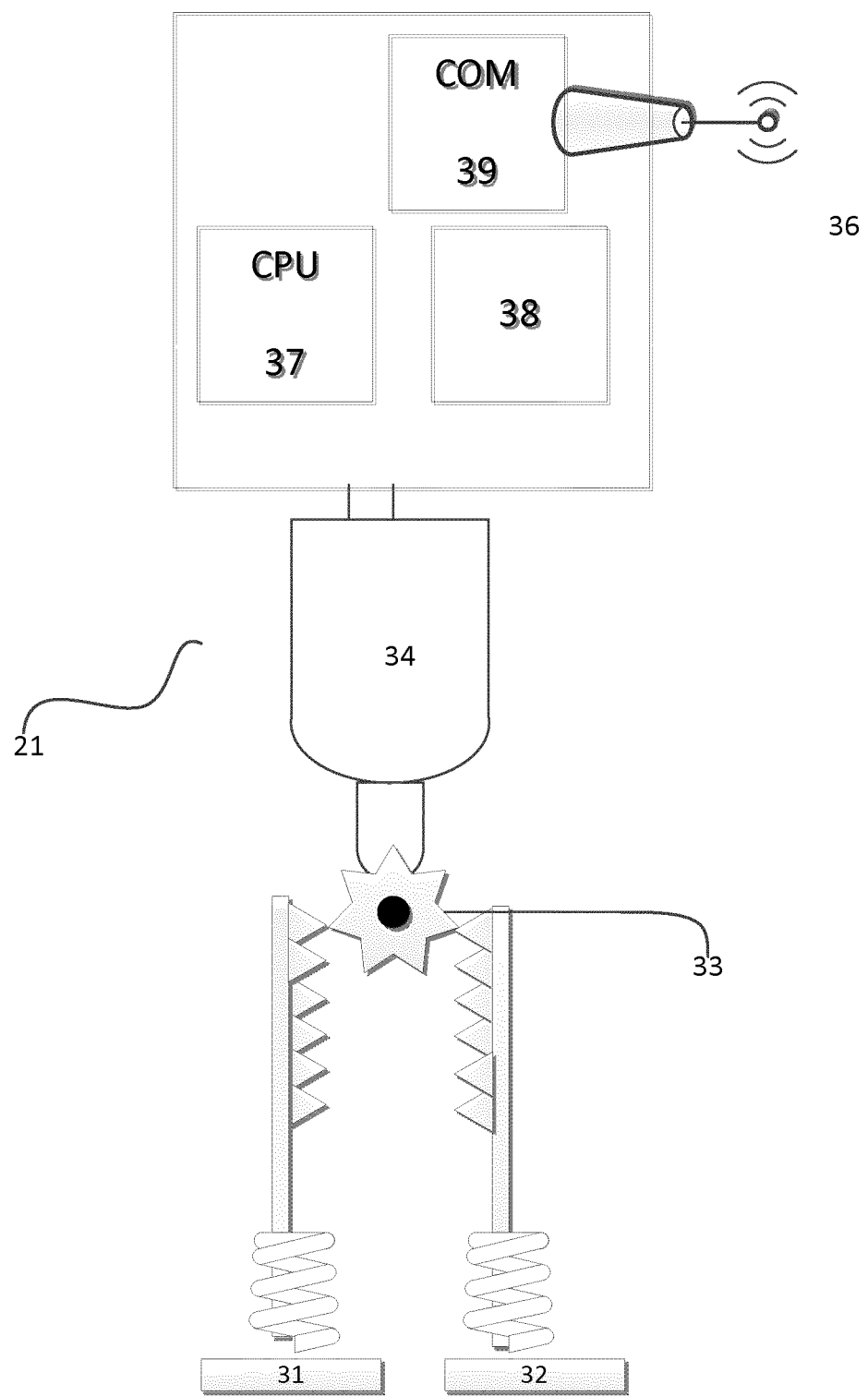
FIG. 3 is a diagram of a wireless device in accordance with an embodiment of the invention.

In the example of FIG. 3, the energy harvesting device 21 comprises two buttons 31 and 32 of which each actuates a electromechanical converter 33-34 so that the actuation of one of the button by the user provides energy to the device 21. The electromechanical converter can be a small dynamo 34 which is actuated in a first direction when button 31 is depressed, and in a second direction when button 32 is depressed. Alternatively, the electromechanical converter can be an electromagnetic element, e.g. a magnetic element moving with respect to a coil; a piezoelectric element, etc. The exact button being pressed can alternatively be discernible by the open/close state of an electrical contact corresponding to a particular button. The radio node 35 connected to the dynamo 34 receives the power harvested and sends a message including the commands corresponding to the depression of the button 31. When power is received from the harvester 33-34, the microcontroller 37 of the radio unit 35 controls the communication unit 39 to prepare a message to be transmitted by means of the transceiver module 36, based on the configuration data stored on the memory 38. It is to be noted that in this example only one harvester 33-34 is needed for a plurality of energy inputs (here the buttons 31 and 32). It is to be noted that the proposed arrangement is an illustrative example and could be implemented with any wireless node architecture, for example as a one chip solution, with radio microcontroller also doing the frame preparation. It is also possible that there is no microcontroller, but a simple state machine handling the message transmission. Each energy input 31 or 32 corresponds to a respective logical entity capable of independently communicating with a network. Therefore, to be able to distinguish communication related to particular energy inputs, especially if they are identical otherwise (i.e. resulting in generation of the same commands), on top of a single radio unit, a plurality of logical entities needs to operate. Then, the wireless device sends a command message, for example a Green Power Device Frame (GPDF) in accordance with the ZigBee Green Power specifications.

The discrimination of the messages received from particular logical entities of the wireless device can be done by the paired devices (sinks) using one or more of the following methods: on reception, filtering by the logical entity being the message initiator, different reception mode (direct reception from the wireless device or reception of wireless device commands forwarded by proxies), different communication mode (unicast, derived groupcast, pre-commissioned groupcast, broadcast), and for groupcast, different derived group identifier (e.g., in ZigBee Green Power, the GroupID derivation mechanism could include the endpoint value, so that different derived GroupIDs are used for different logical entities).

The bidirectional communication feature of Green Power, i.e. the capability of sending a frame to and receiving a frame by the GPD, is tailored to the limited energy-resources of the Green Power Device. The wireless device supporting the feature can, under application control, open a reception window for a short period of time after its own transmission. In the current GP specification v1.0, the gpRxOffset, defining the time offset between the start of the GPD's transmission and the start of the GPD's reception window, is 5 ms. This duration could be increased in future releases of the specification but is still limited.

Therefore, to transmit a message to the GPD according to the communication feature of Green Power, special precautions need to be taken. The nodes capable of performing the transmission to the GPD will be referred in the remainder of this document as proxies; in terms of the ZigBee Green Power specification this role can be taken by different device types, the devices paired to the GPD (the sinks), the devices forwarding on behalf of the GPD (the proxies) or any devices willing to directly communicate to the GPD, e.g. devices involved in network maintenance tasks, such as commissioning tool, network coordinator, network manager or trust centre. In these examples, a proxy or proxy node is a node which can transmit to a wireless device. Analogously, the table to store information related to the wireless device can be, dependent on the device type, a proxy table, a sink table, or any other structure fulfilling this purpose. Since such wireless device in some implementations cannot receive continuously but only at unscheduled and irregular reception opportunities, the proxy nodes can receive the messages addressed to these wireless devices, buffer these messages until a reception opportunity for this wireless device occurs. Further, a proxy node can perform any other tasks typical for the device type implementing the proxy role, including forwarding messages from the wireless device to the target devices, executing the messages from the wireless device, communicating with a user, etc. Thus, one physical networked device can perform both proxy role and the role of a source device for the messages to the wireless device. To avoid transmissions from different proxy nodes during the same reception opportunity because of the extremely short reception window (again restricted by the GPD's energy budget), one of the proxy nodes is elected as a TempMaster. Indeed, the devices transmitting to the GPD cannot perform CSMA/CA and/or retry on lack of (MAC) acknowledgement from the GPD, but have to send immediately after expiration of the gpRxOffset. Thus, the system must guarantee that for each reception opportunity for a given GPD there is system-wide only one device with a frame to send to this GPD (i.e. only one device with a gpTxQueue entry). This TempMaster is the only proxy node transmitting to the GPD at a time. There is a uniform process for TempMaster election, allowing to pick one and the best TempMaster to maximise the reception probability by the GPD (i.e. a sender with strongest signal from the GPD, and if multiple, one with the lowest address), even if multiple devices select the TempMaster independently. To further guarantee that only a single frame is pending per GPD at any given time, the address of the selected TempMaster is broadcast, allowing the previous TempMaster(s) to purge their gpTxQueues.

The command to be delivered to the GPD needs thus to be buffered in the TempMaster, in order to be ready for the GPD transmission. The Green Power specification defines the gpTxQueue for that purpose. Since the reception opportunities by the GPD may be scarce, despite the short time interval of gpRxOffset, the frame must be delivered securely; i.e. the device transmitting to the GPD has to verify that the received trigger frame is formatted correctly and protected according to the prior agreement with the GPD, and then security process the to-be-sent frame.

Figure 6:
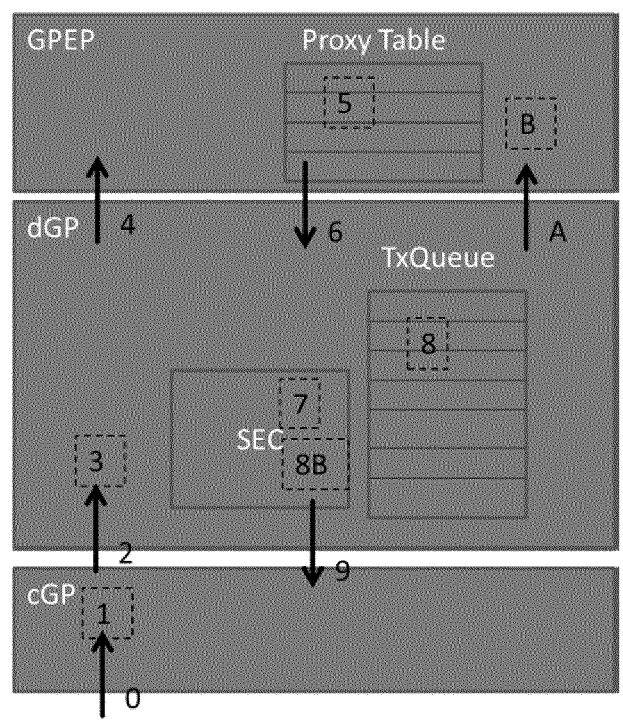
FIG. 6 is a block diagram showing the generation of messages in accordance with the ZigBee Green Power specifications.

FIG. 6 shows an illustrative process for GPDF transmission by a GP infrastructure device (a TempMaster). The diagram below illustrates conceptually, how the sending of the GPDF to the GPD is handled, as described by the GP specification.

It illustrates the interaction between the Green Power EndPoint (GPEP), the dedicated Green Power stub (dGP) and the common Green Power stub (cGP).

This process is triggered by the not shown step—1, where the GPEP makes a GP-Data.request to dGP, which results in placing a frame to be sent to the GPD in the dGP's gpTxQueue. This can result from an over the air communication step—2, i.e. reception of GP Response command of the GreenPower cluster. The frame stays in the queue, until entry lifetime expires, until the frame gets removed from the queue by the GPEP or until there is a transmission possibility, whichever comes first.

At step 0, a frame reception indication is passed up from the MAC.

The frame is subsequently, as illustrated by step 1, pre-processed by the cGP (filtering frames out based on basic settings, incl. ApplicationID value, frames Direction, duplicate frames), and passed on (in dGP-DATA.indication) to the dGP (step 2).

The dGP determines the security settings used (step 3), and raises a GP-SEC.request callback to the GPEP (step 4), asking for the full set of security credentials (incl. the key value) for this particular GPD ID. At step 5, the GPEP checks the Proxy/Sink Table (depending on the type of the device communicating back to the GPD) for the entry related to the GPD, and if the settings provided by GP-SEC.request (security level, key type, frame counter) are correct, and then at step 6 it responds with GP-SEC.response, carrying a corresponding status value (MATCH, DROP, PASS UNPROCESSED) and, if appropriate, the security credentials.

If the dGP is required to security-process the frame, it does so in step 7. If the Security processing succeeds, i.e. the Message Integrity Code (MIC) of the frame is correct, and the incoming frame had the RxAfterTx flag set, indicating GPD's reception opportunity, the dGP checks in step 8 whether there is a frame pending for this GPD in dGP's gpTxQueue. If a pending frame is found, it is protected (step 8B) and passed on to cGP and MAC for transmission (step 9).

In step A, the dGP passes the entire content of the received frame, together with the reception metadata, to the GPEP (via GP-DATA.indication). As step B, the GPEP handles the incoming frame (e.g. executes the command it carried, if it is a paired sink, and/or forwards the frame to the paired sink, if it is a proxy/combo minimum) as described by the GP specification.

The communication mechanism to the wireless device 21 explained above can be used for different purposes. Illustratively, in the example of a ZigBee Green Power network, at commissioning time it can be used to provide the GPD with the operational channel of the network. For that purpose, at commissioning time, the TempMaster is temporarily put on the channel on which the GPD toggling through the channels would offer the next reception opportunity, to transmit the identifier of the network operational channel to the GPD. Further, at commissioning time, other network configuration parameters such as network identifier (PANId) or the security key can be delivered to the GPD. It can also be used at operation time, to update any of those network configuration parameters. It can further be used to provide/update any application data to/of the GPD, e.g. request/write attributes, change reporting frequency, provide attribute update required for GPD operation, etc.

The GPD specification currently defines a number of devices, from generic switches (indicating the fact of a button being pressed and released), to on/off and dimming switches, to scene and colour controllers, to door locks, to various types of sensors.

Although not specified, the wireless device 21 as shown on FIG. 3 illustrated by the 2-rocker switch example must be feasible also with the Green Power standard. This is currently not particularly well described in the GP specification.

The ZigBee Green Power specification provides two addressing schemes for the wireless device 21, here a GPD. Which of the addressing schemes is used is clearly indicated by the network header flags of the GPDF. The 4 Bytes SourceIdentifier (SrcID) is transmitted in the GPDF network header; it is managed by the ZigBee Alliance and allows for a more compact frame. The 8 Bytes IEEE address is transmitted in the GPDF MAC network header, is managed by IEEE and while longer, provides for almost unlimited address space.

For the GPD identified by an identifier SrcID, the GP specification recommends using multiple SrcIDs, one for each instance of the identical functionality. Therefore, the multiple logical entities are identified by multiple identifiers SrcIDs. Note: if the functionality is not identical and/or the different GPD elements do not have to control separate groups, then one SrcID can be used for the entire GPD. No further implementation details are currently mentioned in the GP specification for this use case.

Another option given by the Green Power standard is to solve the use case above for IEEE-addressed GPD by adding an endpoint field to the NWK header of the Green Power Device Frame (GPDF) (as an extension to the solutions proposed in 095499r24, see ZigBee document 14-0203r01). The endpoint field carries the endpoint identifier identifying a logical entity of the wireless device. The endpoint field has to be present in GPDF to and from an IEEE-addressed GPD. As a consequence, the endpoint field has to be added to the Proxy/Sink Table entries, so that the proxies know where to forward frames from a particular endpoint to, and the sinks know frames from which endpoint are to be executed; and to any Green Power cluster command carrying the GPD identifier. All the endpoints are proposed to share the same security credentials, including security key and frame counter.

More generally, the wireless device 21 of FIG. 2 comprises at least one energy input (a rocker, a photovoltaic cell) for an energy harvester. In this case, a transmission can be triggered or enabled at least in part by the harvesting of energy through said energy input. For example, the actuation of the rocker by a user triggers a transmission from the node. Light received at the photovoltaic cell can enable transmissions, for example periodically triggered during the whole period where energy is received at the cell. Then, a reception opportunity occurs at a predetermined time instant after such transmission period from the wireless device. It is to be noted that said energy input is associated with a logical entity. For example, the button or any part of a rocker that can be separately actuated is associated with an endpoint. Then, the transmission period and the following reception opportunities are associated with said logical entity. In another variant, one energy input of an energy harvester can be used for multiple logical instances. For example, a multi-sensor wireless device (e.g. sensing humidity, temperature and $CO_2$ concentration) could be powered by a photovoltaic cell, with the transmission schedule is determined by the application, possibly separately for each logical entity. In general, the energy harvesting may be just the necessary enabler for the transmission, while the actual trigger for the transmission can be independent, and e.g. be based on user action (e.g. a sensor powered by a photovoltaic cell reporting only upon a button push), time schedule, measured value, or result of previous communication exchanges.

While this solution seems similar to the ZigBee concept of an endpoint on a ZigBee End Device (ZED), with the separation according to the OSI layers between the IEEE-identified radio and networking stack, and endpoint-identified applications on top, it is not quite the same.

In ZigBee, the ZED has one parent at a time, responsible for all the communication to and from this particular ZED, i.e. forwarding of the frames originated by the ZED and buffering the frames for ZED, if sleeping; independent of the number of endpoints a ZED has, and ZED's endpoint involved in a particular communication exchange. In case of a Green Power based multi-rocker switch—independent of the addressing mode used—communication from and most notably, also to, each of the endpoints may be handled by a different TempMaster node, since each endpoint may control another (set of) sinks, and each sink selects its own Temp-Masters.

In the example of FIG. 2, the case of having different TempMaster per endpoint is illustrated. Here, the right rocker 211 (endpoint X) of the wireless device 21 with IEEE address 1 controls the luminaire driven by the Green Power Sink (GPS) 25, with which it has to communicate via Green Power Proxy (GPP) 24. If the proxy node 26 is out of range of the wireless device 21 with IEEE address 1, then the sink 25 will select GPP24 as the TempMaster for the communication to endpoint X associated with the rocker 211. The left rocker 210 (endpoint Y) of the wireless device 21 with IEEE address 1 controls the sink 23 in its direct range. Thus, there is no need of an intermediary proxy node for this communication. If the sink 23 has the capability of bidirectional communication in-range (and better signal strength than GPP1, if forwarding to sink 23), then it will likely appoint itself the TempMaster for the communication to endpoint Y. Therefore, the two logical entities formed by the endpoints X and Y can be handled by two distinct proxy nodes in this example. If the sink 25 uses lightweight unicast mode, the sink 23 may not even be aware of any forwarding originated by the proxy node 24. Also, in case of groupcast forwarding, the messages forwarded to the group the sink 25 is member of would be dropped by the lower layers of the ZigBee stack of the sink 23 if it is not a member of the same group.

Due to the fact that different proxies are likely to handle the traffic of different endpoints of one GPD depending on the target (group), communication back to the Green Power Device, i.e. Green Power bidirectional commissioning or operation, poses some problems, especially if different endpoints are used not equally often.

If—in a hypothetical solution—each TempMaster would only handle incoming and outgoing messages of the endpoint it is proxying for, this would lead to the following issues. First, it limits the chances of delivering a frame to a particular logical entity to only the reception opportunities following the transmissions from this very logical entity. Thus, endpoint X could only receive after transmission for endpoint X, i.e. after actuation of the right rocker 211.

This would especially be problematic if the endpoints are used with different frequency/intensity (e.g. one mostly and the other one hardly ever). Further, it can become particularly problematic in case of parameters that are applicable to the entire GPD, like the network configuration parameters (PANId, channel, key). If the sink paired to the seldomly-activated endpoint becomes appointed to deliver the parameter update, e.g. through self-appointment, random selection, order of invocation, or via some intelligence, e.g. a tool/manager node, then the parameter can be delivered to the GPD with a high delay or never, breaking the operation also of the other, frequently used, endpoint.

If—in another hypothetical solution—the TempMaster would deliver the pending frames upon transmissions from ANY endpoint of that GPD, this would lead to the following issues. First, it would globally create only one gpTxQueue entry per GPD, irrespective of the number of endpoints (and thus involved proxies/sinks), which will—especially in case of many endpoints requiring reception of many different information elements—ultimately slow the delivery of data to the GPD, and push the responsibility for retrying a failed delivery to the Green Power End Point (GPEP) of the paired sink or another source of information for the GPD, a mechanism which is not specified today in the standard. Further, it would cause some unnecessary processing, since steps 7 to A of FIG. 6 (especially the calculation-costly step 7) would have to be performed for ANY frame with RxAfterTx=0b1 received from the GPD, irrespective of the endpoint, and the frames from non-paired endpoints would only be dropped in step B.

Therefore, it is proposed in a first embodiment of the invention that the message source selects a transmission mode from a set comprising at least a first transmission mode and a second transmission mode. The first transmission mode indicates to transmit a message addressed to a particular logical entity during the reception opportunities corresponding to one single logical entity, preferably the one to which the message is addressed. The second transmission mode does not restrict the transmission times to reception opportunities associates to a single entity, but the reception opportunities corresponding to a plurality of logical entities, for example all the logical entities, i.e. transmission in any reception opportunity regardless the logical entity the reception opportunity is associated with.

Indeed, this solution enables to benefit of more reception opportunities in case for example it is critical for the message to be delivered fast or to take into account some inequity in the reception opportunities of the different logical entities of the wireless device.

It is to be noted that this selection method at the message source is based on the assumption that the wireless device comprises a set of at least two distinct logical entities. Thus, the method is operative even if the wireless device has a single logical entity.

Figure 4:
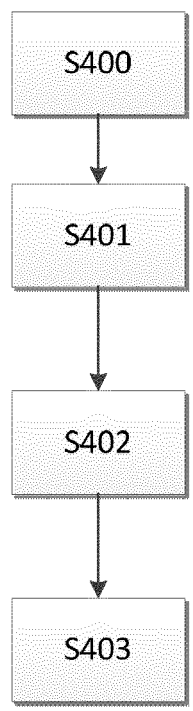
FIG. 4 is a flowchart of a method for communicating a message in accordance with an embodiment of the invention.

This embodiment will now be explained in greater detail with reference to FIG. 4. As illustrated on FIG. 4, when a message source, like for example the device 25 or 23 needs to send information or data to the wireless device 21, the message source first selects a transmission mode for the message at step S400. This selection is done among a set of transmission modes, for example a predefined set of transmission modes. The selection of the transmission mode can be made on various criteria as will be explained in the examples hereafter.

The first transmission mode limits the reception opportunities for the message to the reception opportunities that are associated with one logical entity of the wireless device 21. For example, in the first transmission mode, if the endpoint X associated with the button 210 is selected, it means that the message can only be transmitted during a reception window corresponding to this endpoint X. This means in the example of a GPD that this reception opportunity follows a transmission associated to the endpoint X and triggered by the actuation of the button 210 by a user. Reception opportunities related to other logical entities cannot be used.

The second transmission mode, on the contrary offers the possibility to use the reception opportunities corresponding to more than one logical entity. In an example, this could correspond to the reception opportunities associated to all the logical entities of the wireless device 21, or even all the reception opportunities of the wireless device 21. Indeed, in this transmission mode, a fast transmission can be done so that it is suitable for the transmission of messages with higher priority or that are critical for the operation of the wireless device like for example a network parameter configuration message. The second transmission mode could include the possibility of transmitting in reception opportunities associated with any logical entity of the wireless device. The wireless device may have, in addition to the reception opportunities associated with a logical entity, reception opportunities that are reserved for another purpose, for example configuration purpose. These could be for example taken from reception opportunities taken from a logical entity that is transmitting often or punctured every N reception opportunities. Alternatively, these could follow the transmissions with an identifier of logical entity corresponding to the reserved logical entity.

In this example of the invention, there are only 2 distinct transmission modes. However, there could be further transmission modes, for example using exclusively the reserved reception opportunities.

The selection of the transmission mode, here between the first transmission mode and the second transmission mode, can be based on one or more characteristics of the wireless device 21; for example, the number of logical entities on the wireless device, or the type of wireless device. For example, if a particular sensor (e.g. CO2 sensor) must operate with high reliability, the transmission mode for the messages that influence the operation (reliability) of this sensor, such as e.g. operational channel or network key update, can be selected such that the message has high probability of being successfully delivered. This may be require selection of less reliable transmission modes for devices which operation is not so critical for a network, or for less critical endpoints and/or updated messages for the same wireless device. In another example, if the wireless device is of the type comprising a switch and a light sensor powered by energy harvested by a photovoltaic cell, the logical entity linked to the light sensor might not be operative during long periods of time at night and it would be beneficial to send over to an earlier reception opportunity. Characteristics of operation can also be taken into account, for example, the frequency of communication of logical entities. For a wireless device having two switches, it might be that the one controlling luminaires of a corridor is more often used that the one operating a small room. In view of this inequity, the selection of the second transmission mode could be done to ensure that the switch controlling the small room receives the message quickly. Furthermore, it is also possible to take into account characteristics of the message itself, like the type of communicated information (e.g. network configuration parameters, application data, application data request), the urgency of delivery of the information in the message, the applicability of the information conveyed in the message to one or more logical entities of the wireless device or entire wireless device, the need for any sort of confirmation by the wireless device. Another transmission mode selection criterion could be the desired reliability of the delivery; for example, by selecting the first transmission mode for a message applicable to the entire wireless node, it is possible to create multiple messages to be delivered to the wireless node; Moreover the characteristics of the source node may play a role in the selection of the transmission mode. For example, the source node type, the source node ability to be a proxy, the exactness of knowledge about proxies, number of source nodes paired to or communicating to a particular logical entity, or the delivery success rate of previous transmissions. In another example, selecting the first transmission mode for a message, especially for a logical entity to which only few other source communicate, would reduce the chance of this message being replaced in the gpTxQueue by another message. Yet another criterion for transmission mode selection could be the relation between the transmission modes, e.g. their respective priorities and arbitration rules.

Once the transmission mode is selected at step S400, the process moves to S401, where the message source checks which proxy node is to be used for forwarding the transmission of the message itself. It is checked to which logical entity the message is addressed and which transmission mode has been selected. If the first transmission mode was selected, the message source may select the TempMaster associated to the logical entity to which the message needs to be addressed; this may be the proxy that was appointed in the commissioning process the task of for forwarding on behalf of this wireless device; or the most suitable proxy of those that forwarded a message from the wireless device, e.g. according to the TempMaster election rules as specified in the GP specification; the TempMaster address may be stored permanently (e.g. in non-volatile memory, e.g. as part of the sink table), temporarily, or not stored at all. If the second transmission mode is selected, the selection of the transmission mode continues in step S401 which comprises the selection of a path for the message. In particular, it may be chosen a particular TempMaster node that will handle the transmission of the message. This TempMaster node is in an exemplary embodiment a proxy node forwarding for one of the logical entities of the wireless device, or the source of the message itself. However, it is also possible to select the TempMaster nodes out of the set of other devices capable of communication to the wireless devices, e.g. GP-enabled nodes in the vicinity of the wireless device but that are not associated with any of the logical entities. This selection of the TempMaster node enables to select a TempMaster node which for example has a better transmission reliability (less failure of transmission) or which is less used to benefit of space on its buffer dedicated for the transmission to the wireless device. Once the transmission mode has been selected, the process moves to step S402. In this step, the message source creates a control message to command the transmission of the message to the wireless device. It is to be noted that if the message source is also the proxy node selected at step S401, this control message will not be sent but is used as an interlayer primitive for the creation of the message itself. There may be no transmission over the air in such a case.

Figure 5:
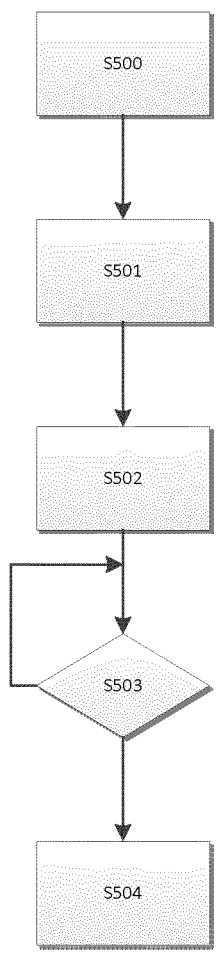
FIG. 5 is a flowchart of method for forwarding a message in accordance with an embodiment of the invention.

Therefore, if the message source is the dedicated proxy node, the sending of the control message at step S403 needs to be interpreted as an internal communication from a higher layer to a lower layer. This control message may include an indicator for the indication of the selected transmission mode to the proxy node in charge of the transmission of the message itself. As will be explained in connection with FIG. 5 illustrating the transmission of the message by the proxy node, this proxy node will transmit the message based on the indicator value which is representative of the selected transmission mode.

This indicator can be based on the use of reserved values for the logical entity identifier. The logical entity identifier can be a field in the control message which identifies to which endpoint the message needs to be addressed. The control message may also include the identifier of the wireless device itself. In case the first transmission mode is selected at step S400, the logical entity identifier field carries the identifier of one of the logical entities of the wireless device. The reception opportunities for the transmission of the message are limited in this example to the reception opportunities associated with this logical entity. For instance, if the endpoint X of the wireless device 21 is identified, it means that the reception opportunities are those following the transmission periods triggered by the actuation of the button 210. However, if the second transmission mode is selected, the value carried by the indicator is a reserved value, which is forbidden to be used to identify a logical endpoint.

The indicator could thus be implemented as a reserved ("wildcard") value of the logical entity identifier field. However, then it would not be possible to indicate both the endpoint destination and wildcard delivery at the same time, thus making the solution only applicable to data interesting for the entire wireless device or (GPD), such as network parameters or application configuration applicable to all endpoints, or for special cases, when the data is implicitly destined to only limited set of endpoints, e.g. because of particular type or object.

An alternative solution would be to use a further field carrying a flag, i.e. a short codeword of 1, 2 or 3 bits depending on the number of transmission modes that needs to be signaled. This would enable to signal both the transmission mode which is selected and also the endpoint to which this message needs to be addressed. Indeed, in the second transmission mode, although any reception opportunities (i.e. associated with any logical entities) can be used for the transmission of the message, the message may in fact be addressed to one of the set of logical entities. As seen earlier, the second transmission mode may be used to compensate an inequity of reception opportunities due to a less frequent use of one of the two rockers of the switch. There is nevertheless a need to identify the message target. Preferably, the indicator is explicit and implemented independently of the endpoint field, as in the variant of the flag. This way, it allows for decoupling the destination endpoint addressing from the endpoint used for the delivery.

Still, this solution can preferably be combined with some special reserved values of the endpoint field, e.g. indicating "all endpoints" (e.g. 0xff) or "node-wide endpoint" (e.g. 0x00). This way, also the delivery to those special endpoint identifiers can be carefully chosen to either happen upon reception of a frame from the wireless device carrying the exactly same logical entity identifier, or to happen upon reception of a frame from any endpoint. In extension to the previous variant, delivery to any special reserved endpoint could happen in reception opportunities of any other special reserved endpoint, e.g. any communication to endpoint 0x00 or 0xff could then also be delivered upon reception of frame from this GPD with endpoint 0xff or 0x00, respectively.

As an example, the wireless device (GPD) can use the special reserved logical identifiers (endpoints) for special types of communication, e.g. heartbeat, acknowledgement. This way, it may offer a transmission opportunity for special purposes (e.g. of data interesting to the wireless device as a whole, at commissioning time) or to special entities on the wireless device (e.g. to one or multiple of the lower layers of the wireless device, rather than an application-level logical entity). The proxies may be instructed to deliver messages coming from those special reserved endpoints in a particular way, e.g. send it to all paired sinks, send it in broadcast to the entire network, or don't send it to any sinks, but e.g. to a management device instead. There may be multiple classes of such special reserved endpoints, to handle the different cases (e.g. 0xff could result in broadcast, while 0xfe could result in forwarding to the management entity and 0xfd could be used for communication with a commissioning tool, e.g. only at commissioning times). Special reserved endpoints can further be used at commissioning time and/or for any maintenance frames, e.g. GPD Decommissioning command, etc.

Eventually, once the control message with the indicator has been created, it is sent to the selected dedicated proxy node at step S403. It is to be noted that in this example, the control message includes in a single control message the indicator indicative of the selected transmission mode, the selected proxy node (TempMaster) identifier that will carry out the transmission of the message, and the message itself. However, these pieces of information may be transmitted separately and using different communication types (unicast/broadcast). Further details regarding the control message generation and creation are explicated below with reference to the particular example of a ZigBee network including devices supporting Green Power. In this example, the control message may be the (over the air) GP Response command which instructs the TempMaster to transmit the message, here a GPD command.

As seen earlier, the indicator needs to be implemented in the GP Response command of the Green Power cluster. This is the message from the sink (e.g. node 25) to the selected TempMaster, fulfilling two purposes: communicating the entirety of the GPD command to be delivered to the GPD and announcing the selected TempMaster.

The GP Response command in ZigBee Green Power v1.0 (095499r24, sec. A.3.3.5.4, page 106 line 24—page 107 line 17) were formatted as indicated below.

| Octets | 1 | 2 | 1 | 4/8 | 1 | Variable |
|---|---|---|---|---|---|---|
| Data Type | Unsigned 8-bit integer | Unsigned 16-bit integer | 8-bit bitmap | Unsigned 32-bit integer/IEEE address | Unsigned 8-bit integer | Octet string |
| Field Name | Options | TempMaster short address | TempMaster Tx channel | GPD ID | GPD CommandID | GPD Command payload |

The Endpoint field will be added in the GP v1.0.1 specification (14-0093, r03 or later), according to the proposal as described in 14-0203r01); it will be 1 octet in length and present when the ApplicationID sub-field of the Options field would be set to 0b010, indicating GPD identified by GPD IEEE address, as indicated below.

| Octets | 1 | 2 | 1 | 4/8 | 0/1 | 1 | Variable |
|---|---|---|---|---|---|---|---|
| Data Type | Unsigned 8-bit integer | Unsigned 16-bit | 8-bit bitmap | Unsigned 32-bit | Unsigned 8-bit integer | Unsigned 8-bit integer | Octet string |

| Octets | 1 | 2 | 1 | 4/8 | 0/1 | 1 | Variable |
|---|---|---|---|---|---|---|---|
| Field Name | Options | integer TempMaster short address | TempMaster Tx channel | integer/IEEE address GPD ID | Endpoint | GPD CommandID | GPD Command payload |

The current format of the Options field of the GP Response command (according to ZigBee Green Power v1.0, ZigBee document 095499r24, sec. A.3.3.5.4, page 106 line 27-28) is represented in the table below.

| Bits: 0 . . . 2 | 3 . . . 7 |
|---|---|
| ApplicationID | Reserved |

In accordance with this example, this option field could be changed as proposed.

| Bits: 0 . . . 2 | 3 | 4 . . . 7 |
|---|---|---|
| ApplicationID | Deliver via matching endpoint | Reserved |

In this proposal, if the flag "Deliver via matching point" is set to 0b1, this would indicate that the GPD command carried in this GP Response shall only be delivered to the GPD upon reception of a GPDF with RxAfterTx=0b1 (i.e. this value of RxAfterTx indicates that there is a reception opportunity following this transmission from the GPD) with exactly the same endpoint identifier. This would correspond to the first transmission mode. Special reserved endpoints could be grouped, so that data to a reserved endpoint could be delivered upon reception of a frame from any reserved endpoint (e.g. any communication to endpoint 0x00 or 0xff could then also be delivered upon reception of frame from this GPD with endpoint 0xff or 0x00, respectively.

If the flag is set to 0b0, it would indicate that GPD command carried in this GP Response shall only be delivered to the GPD upon reception of a GPDF with RxAfterTx=0b1 with any endpoint identifier. This corresponds to the second transmission mode.

Further, the indicator needs to be implemented in the GP-DATA.request primitive, so that the GPEP of the TempMaster can communicate this to the dGP of the TempMaster. The following table shows the parameters of the GP-DATA.request as in the Green Power specification v1.0 (095499r24, sec. A.1.3.2, page 31 line 4—page 32 line 1).

| Name | Type | Valid Range | Description |
|---|---|---|---|
| Action | Boolean | TRUE/FALSE | TRUE: add GPDF into the queue<br>FALSE: remove GPDF from queue |
| TxOptions | 8-bit bitmap | Any Valid | The transmission options for this GPDF. These are a bitwise OR of one or more of the following:<br>b0 = Use gpTxQueue<br>b1 = Use CSMA/CA<br>b2 = Use MAC ACK<br>b3-b4 = GPDF frame type for Tx (can take unreserved values as defined in Table 11 of GP specification)<br>b5-b7 - reserved |
| ApplicationID | 8-bit enumeration | 0x00, 0x02 | ApplicationID of the GPD to which the ASDU will be sent; ApplicationID 0x00 indicates the usage of the SrcID; ApplicationID 0x02 indicates the usage of the GPD IEEE address. |
| SrcID | Unsigned 32-bit Integer | 0x00000000-0xffffffff | The identifier of the GPD entity to which the ASDU will be sent if ApplicationID = 0b010. |
| GPD IEEE address | IEEE address | Any valid | The identifier of the GPD entity to which the ASDU will be sent if ApplicationID = 0b010. |
| GPD Command ID | Integer | 0x00-0xff | The identifier of the command, within the GP specification, which defines the application semantics of the ASDU. |
| GPD ASDU Length | Integer | 0x00 - (aMaxMACFrameSize-9) | The number of octets in the transmitted GPD ASDU. |
| GPD ASDU | Set of octets | — | The set of octets forming the transmitted GPD ASDU. |
| GPEP handle | Unsigned 8-bit integer | 0x00-0xff | The handle used between GPEP and dGP stub, to match the request with the confirmation. |
| gpTxQueueEntryLifetime | Unsigned 16-bit integer | 0x0000-0xffff | The lifetime of this packet in the gpTxQueue, in ms. For GPD Commissioning Reply, initialized to CommissioningWindow.<br>0x0000 indicates immediate transmission.<br>0xffff indicates infinity. |

The Endpoint parameter will be added in the GP v1.0.1 specification (14-0093, r03 or later), according to the proposal as described in 14-0203r01); it will be 1 octet in length and valid when the ApplicationID parameter would be set to 0b010, indicating GPD identified by GPD IEEE address.

The indicator could be preferably added as one of the now reserved flags in the TxOptions parameter. Alternatively, it could be a separate parameter of the GP-DATA.request primitive. The indicator can be formatted as the Boolean Deliver via matching endpoint flag proposed above.

As explained above, thanks to these embodiments, the message source of the data to be sent to the GPD can choose the value of the indicator and/or choose between the dedicated endpoint it is communicating with and any of the other endpoints and/or the reserved endpoints, based on the type or character of data to be delivered. The source could choose the value of the indicator depending on the frequency of the communication with a particular endpoint. Or, if it has the knowledge, the ratio of the frequency between communication with this and other endpoint. This may specifically be true for a management device or a sink in radio range of the GPD. The source could choose to deliver via another specific endpoint than the one it is paired to, if it is aware of the other endpoints. This may specifically be true for a management device. This may be used e.g. for urgent network-wide updates, e.g. of key, network identifier or channel. This may specifically be true if the message source is a management device.

The source could choose the indicator dependent on the source type. The sink, because it may not be aware of the communication needs of other sinks (paired to the same of different endpoint) may tend to choose delivery via the endpoint it is paired to/usually communicates with. A central intelligence, e.g. management device or a commissioning tool, likely to be the only one to communicate a particular data item (e.g. information about channel or key update) to the GPD, may choose the delivery over any endpoint.

The choice may further depend on the (exactness) of knowledge of the number of proxies involved, of the fact of the source being or not being the TempMaster (in the vicinity of the GPD), or on the total number of endpoints implemented by this GPD; e.g., to deliver a key update to a 2-endpoint device (e.g. 2-rocker switch), it may be possible to utilize the 2 dedicated endpoints. To deliver a key update to a 64-endpoint device (e.g. 64-button remote), it may be better to use ANY endpoint.

Reception of the control message by the dedicated proxy node causes the transmission of the message during one of the reception opportunities corresponding to the selected transmission mode. The transmission of the message by the proxy node is explained with reference to FIG. 5.

When the proxy node receives the control message at Step S500, this triggers the transmission process. As indicated earlier, the reception can be reception by a lower layer of the primitive generated by a higher layer requiring the transmission of the message, if the message source is also the selected proxy node for the message transmission. If the message source and the selected proxy node are different devices, this reception is in fact resulting from a transmission over the air from the source to the selected proxy; it may be followed by the primitive exchange between the stack layers of the selected proxy. At step S501, the proxy node detects which transmission mode is indicated in the control message. In a first embodiment, the control message further comprises a logical entity identifier field as explained previously. In this embodiment, the transmission mode is detected based on the presence of a reserved value (wildcard) in the logical entity identifier. If the logical entity identifier identifies one logical entity of the set, the first transmission mode is detected. Then, this means that the reception opportunities defined by the first transmission mode are the reception opportunities associated to the logical entity in the identifier. However, if the logical entity identifier field carries a reserved value, the second transmission mode is detected.

In another embodiment, if the control message comprises a flag and a logical endpoint identifier as described in one of the earlier embodiments, the proxy node can determine the transmission mode based on the flag and also check which logical entity the message is addressed to in the logical entity identifier. At step S502, the message is prepared by the proxy node and buffered in the queue. The queue can be realized as one queue with multiple entries, each entry corresponding to a (different) wireless device and logical entity; it can also be realized as a number of queues, each corresponding to the wireless device or to the logical entity of the wireless device.

To accommodate for the embodiment of the invention including a separate indicator flag, in relation to the ZigBee Green Power specification, the entry of the gpTxQueue would have to be modified to store the indicator as well. The GP v1.0 spec (095499r24) does not prescribe exact format of the gpTxQueue entry. Furthermore, if an entry for this wireless device and the selected logical entity was already present in the queue, the previous entry may need to be replaced or removed, depending on the arbitration policies, as described later.

Then, at step S503, it awaits the reception opportunity matching the requirements of the reception opportunities defined by the selected transmission mode. In the example of the ZigBee Green Power, this reception opportunity occurs after a predetermined time duration following a transmission from the wireless device and a logical entity corresponding to the selected transmission mode, if the RxAfterTx flag of the received message was set. If the reception opportunity corresponds to one of the reception opportunities allowed by the selected transmission mode, the proxy node will transmit the message at step S504. Else, it awaits a valid reception opportunity occurs or until the expiration of the message. As described in reference to FIG. 6, step S504 can contain the additional steps, including validation of the protection of the received message, protecting the to-be-transmitted message, and obtaining the security parameters for the security processing.

To accommodate for that, with reference to the FIG. 6, the GP-SEC.response primitive of step 6 could be extended to indicate that the frame should only be used for delivering a pending message, if any, to the GPD and does not need to be subsequently passed to the application endpoint, the GPEP. This would allow for making the processing on the proxies yet more efficient. The following table lists the parameter of this GP-SEC.response primitive as in Green Power specification v1.0 (095499r24, sec. A.1.3.4, page 33 line 9—page 34 line 1. The Endpoint parameter may be added in the GP v1.0.1 specification (14-0093, r03 or later, according to the proposal as described in 14-0203r01); it will be 1 octet in length and will be valid when the ApplicationID parameter would be set to 0b010, indicating GPD identified by GPD IEEE address.

| Name | Type | Valid Range | Description |
|---|---|---|---|
| Status | 8-bit enumeration | Any valid | The status code, as returned by the GPEP. The following are supported: MATCH DROP_FRAME PASS_UNPROCESSED |
| dGP stub handle | Unsigned 8-bit integer | 0x00-0xff | The handle used between dGP stub and the higher layers, to match the request with the response. |
| ApplicationID | 8-bit enumeration | 0x00, 0x02 | ApplicationID of the GPD entity from which the ASDU was received. ApplicationID 0x00 indicates the usage of the SrcID; ApplicationID 0x02 indicates the usage of the GPD IEEE address. |
| SrcID | Unsigned 32-bit Integer | 0x00000001-0xfffffffe | The identifier of the GPD entity from which the ASDU was received if ApplicationID = 0b00. |
| GPD IEEE address | IEEE address | Any valid | The identifier of the GPD entity from which the ASDU was received if ApplicationID = 0b010. |
| GPDFSecurityLevel | 8-bit enumeration | 0x01-0x03 | The security level to be used for GPDF security processing. |
| GPDFKeyType | 8-bit enumeration | 0x000-0x07 | The security key type to be used for GPDF security processing. |
| GPD Key | Security Key | Any valid | The security key to be used for GPDF security processing. |
| GPD security frame counter | Unsigned 8-bit or 32-bit Integer | As specified by the GPDFSecurityLevel parameter | The security frame counter value to be used for GPDF security processing. |
| gppSecurityWindow | Unsigned 8-bit integer | 0x00-0xff | The gppSecurityWindow value to be used by the GP stub for security processing of this incoming frame. |

For indicating that the received frame, if followed by reception opportunity, should only be used for delivering a pending message to the GPD, and can be dropped then or otherwise, a further status code with a purpose indicator, e.g. TX_THEN_DROP, could be preferably added as one additional value of the Status parameter. Alternatively, the purpose indicator could be encoded as a separate parameter of this primitive.

In addition, if the Endpoint parameter is included in the GP-SEC.request at step 4 of FIG. 6, then the GPEP of a device that is not paired to this GPD ID+Endpoint (the information about it can be found in the Proxy/Sink Table of the GPEP, depending on the exact device type) and not supporting bidirectional communication, can already decide to drop the packet.

If the GP-SEC.request did not contain the Endpoint field, this early filtering would not be possible. Then, all the steps from −2 to B would have to be completed, even for the frames that will subsequently be dropped due to non-matching endpoint.

In a further extension, if the new TX_THEN_DROP status is returned, the dGP could consider to preferably only carry out the security processing of the received GPDF if the RxAfterTx flag of this GPDF was set. Alternatively, the GP-SEC.request primitive could be extended to also include the Endpoint and RxAfterTx flag, and the decision about returning the exact status code (esp. DROP or TX_THEN_DROP) could be shifted to the GPEP. The TX_THEN_DROP status may need to be stored in the relevant gpTxQueue entry.

In a variant of these embodiments of the invention, the proxy node comprises a proxy table storing information regarding the wireless device. In this proxy table, a single proxy table entry can denote one single logical entity of the wireless device, or a set of at least two logical entities of the wireless device. This allows for memory-efficient storage of proxy table entries, especially if information about multiple logical entities of the wireless device needs to be stored; especially for storing the information related to all logical entities, the reserved ("wildcard") value for the logical entity (e.g. 0xff indicating any/all) could be used. The same is applicable to the sink tables on the sinks paired to the wireless device, translation tables on the sink devices, and any constructs for storing data related to the wireless device on the message sources.

Furthermore, consider a GPD that has two logical entities, denoted by two endpoint IDs. As discussed above, an endpoint field has to be added to the Proxy/Sink Table entries, so that the proxies know where to forward frames from a particular endpoint to, and so that the sinks know frames from which endpoint are to be executed. The inclusion of an endpoint field in the sink table enables a sink to be bound to one of the two endpoints, and thus different sinks to be bound to different endpoint, with each endpoint having its own proxy table entry with the list of sink (groups) to forward the communication to; it allows the proxies to only forward the communication of the selected endpoint (or endpoint they were selected for), thus allowing for reducing the traffic over the network. Now consider the case where the two endpoints are both bound to (clusters in) the same sink device. This might happen for example if the sink device is a home control hub (concentrator/gateway) acting as an intermediate between the wireless device and any devices that are to react to the use of the endpoints (buttons/sensors) on the wireless device. In that case, the GP specification as written now would call for two proxy table entries to be created, one for each endpoint. Instead, it is envisaged that a single proxy table, of a special type, is created in each proxy concerned, with this table entry covering both endpoints. A special flag or value can be used to denote that this proxy table entry is of a special type; preferably a reserved value of the endpoint field (e.g. 0xff, denoting any/all). The forwarding (binding) information in the proxy table entry is then to be applied in the same way to messages from both endpoints.

Further variants for the indicator are listed below.

The transmission mode selection method can be influenced by the delivery success rate. For example, if the TempMaster frequently drops the buffered messages for a particular wireless device and logical entity combination, due to overwrite from another sink (e.g. caused by many sinks communicating to/via this logical entity) or message timeout (e.g. cause by infrequent communication from the selected logical entity or insufficient reception reliability by this particular proxy), they could change the indicator (e.g. to more promiscuous)—or communicate the reliability information (or the message replacement) back to the message source, so that the message source can adapt its transmission mode (and/or proxy) selection policy. Using delivery via a reserved endpoint can help de-duplicating the messages as it may purge the queues (if that's the selected arbitration policy); conversely, using delivery via a selected endpoint creates space for buffering multiple messages for the wireless device (one per logical entity); this can be used e.g. for transmissions requiring fast and reliable delivery (as e.g. channel or security key update), with a source creating multiple copies of the same message to the wireless device and addressing each to one of the wireless device's logical entities; sending the copies via multiple proxies would further increase delivery success probability, since it will better protect the delivery against multipath fading and local interference.

The decision to change the indicator can be local at the dGP of the TempMaster. It may also be done by the GPEP. In case of TempMaster proxy or sink, it may already be possible by adding some intelligence to analyse the GP-DATA.confirm statuses (TX_QUEUE_FULL, ENTRY_REPLACED, ENTRY_ADDED, ENTRY_EXPIRED, ENTRY_REMOVED, GPDF_SENDING_FINALIZED) returned upon reception od GP-DATA.request and any subsequent queue-related operation; to be performed by a GPEP of sink communicating via a TempMaster proxy, GreenPower cluster command may need to be added or extended.

The indicator of the control message can be further extended with a priority indicator, to indicate if a particular entry can be replaced by another entry or not (e.g. only be removed by being delivered or by GP-DATA.request with the Action parameter set to FALSE (i.e. remove), and/or by another message with the same or higher priority, but not lower). This would require inclusion of this priority indicator in the GP Response command, GP-DATA.request primitive and gpTxQueue entry. It may be combined with any of the indicators specified above or be a separate indicator.

Further, arbitration rules for gpTxQueue entry replacement (more complex that the today used replacement by the most recent message) may be needed (in addition to or instead of the bullet above), to determine the influence of endpoint and/or indicator on entry replacement/retention. E.g. rules like "message to a specific endpoint cannot replace a message to reserved special endpoint" (or vice versa) or "message with an indicator of delivery via any endpoint cannot be replaced by a message with an indicator of delivery via specific endpoint only" may need to be specified.

Arbitration is relatively easy, if the same proxy node (TempMaster) is selected for subsequent messages. In case different TempMasters are selected, additional communication between the TempMasters and/or between TempMasters and the message sources and/or extensions of the GP Response message may be required. Looking at FIG. 2 for an example, if the proxy node (GPP) 24 has a frame in its gpTxQueue that it is not willing to replace, and it receives a GP Response from the message source GPS 23, announcing lower priority frame, the proxy node 24 (or the message source GPS 25) may itself respond with GP Response, re-announcing the original frame again, and the address of the proxy node GPP24 as the TempMaster.

To do the arbitration, in an example, the proxy node receives from the message source a handling instruction. This handling instruction can be transmitted in the control message, or in the transmission mode indicator itself. The handling instruction relates to the handling of buffered messages in a transmission buffer of the proxy node.

To avoid the need for arbitration as described above, and avoid duplicate frame delivery (e.g. in case of a GPD with multiple endpoints), fewer entries could be made in the gpTxQueue. This can already be achieved as described above, if the central intelligence is the source of information, and it picks the indicator intelligently. Any message the central intelligence may use to communicate with the sinks and/or TempMasters may need to be extended with the endpoint indicator as well.

But assume other cases, e.g. that—for a 64-button remote—all paired sinks want to act upon the changing operational channel and deliver this information to the GPD. To reduce the number of the GP Response messages over the medium, the sinks (message sources) could delay the transmission of GP Response message (or any equivalent message the source uses for communicating to the TempMaster) for an interval out of a variable delay window. This interval could be chosen randomly, based on the frequency of communication with the wireless message GPD, based on how long ago the sink last communicated with the GPD, on sink address, on last security frame counter seen by the sink. If another GP Response would be received within this period, own GP Response could be dropped.

In extension, the GP Response could be checked for fulfilling a certain criteria, e.g. the sink could check if indeed the same message is being transmitted. The check could be done based on entire GPD command, GPD CommandID, the destination endpoint and opt. the indicator. Alternatively, an indication (e.g. another flag in the options field of the GP Response) could be added to indicate the data transmitted, independent of the endpoint and the related indicator, is actually of general importance to the entire GPD.

At the moment, the GP specification only allows only one entry per GPD for the transmission queue in the proxy nodes. A system-wide gpTxQueue containing multiple entries per GPD could be built, if the GP Response message (and the GP-DATA.request primitive) would be extended with an order indication specifying on which of the following reception opportunities to deliver the frame to the GPD. E.g. sink seeing a GP Response carrying a frame to be delivered to GPD 1 in the next reception opportunity (e.g. encoded as a slot field=0x00, for clarity, the value of the security frame counter/sequence number could be included, to indicate when to start the counting and allow to arbitrate between subsequent GP Response transmissions), could choose to send GP Response carrying a frame to be delivered to GPD 1 in next+1 reception opportunity. The TempMasters would obviously have to keep track of the reception possibilities (i.e. the GPDF with RxAfterTx), and update the local count accordingly. The TempMasters which missed a particular number of the GPDF may need to drop some or all queue entries they store.

In extension to the reserved values for the endpoint proposed above, a reserved value can be used to reduce the amount of communication between the message source and the TempMaster, i.e. one GP Response, GP-DATA.request is sent to the proxy with a reserved value in the endpoint field (e.g. 0xfe), and the proxy creates multiple messages, addressed to a number of particular endpoints (in transmission mode 1), e.g. all known to this proxy or all this proxy is responsible for.

The solutions disclosed in the present document are also applicable to GPD identified by SrcID. Since the GP spec recommends usage of separate SrcID for each logical entity, the relation between the multiple rockers is not given by SrcID (since they are different), but could still be obtained.

E.g. the information about the related SrcID could be delivered at commissioning times by the GPD itself, configured by the user, or discovered by the proxy/sink nodes at operational times, e.g. based on RSSI.

Possibly, the source of the information could store the—in addition to the SrcID it is paired to/communicating with—also some or all—of the other SrcIDs, e.g. in case the GPD and the source support bidirectional communication, in order to know where to send the frames to; the selection of the other SrcIDs to store may be based on the type, characteristics and communication characteristics for the logical entity encoded by the particular SrcID. Only selected sources may have this knowledge, e.g. CT/management device, thus increasing the change of successful delivery for those devices.

In a simplest embodiment, the proxies don't have the ability of discovering and/or storing the relation between the multiple endpoints identified by different SrcIDs. Next to its simplicity, this solution also allows to buffer at the proxies more than one message for the GPD, as long as each is addressed by different SrcID, increasing the chance for delivery.

In another embodiment, proxies could have the ability of discovering and/or storing the relation between the multiple endpoints identified by different SrcIDs; and may also apply corresponding arbitration rules. This will allow for de-duplication of messages to the GPD in the system.

Although the present invention and its various embodiments were exemplified in the context of a ZigBee Green Power network, and for controllers like switches, dimmers, remotes, and sensors, it is to be noted that the invention is not limited to such an implementation and could easily be adapted to any kind of network or energy-restricted or energy harvesting devices where there is a need to send a message to a wireless device including more than one logical entities. For example, this network could be a Z-Wave network, or another proprietary solution.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A method for transmitting a message to a wireless device in a mesh network,
   the wireless device comprising a set of at least two distinct logical entities, the wireless device being arranged for receiving a message during discontinuous reception opportunities, the method comprising, prior to transmission of the message, the steps of
   (a) selecting a transmission mode from a set of transmission modes comprising a first transmission mode and a second transmission mode, where,
      in the first transmission mode, the reception opportunities for the message are limited to the reception opportunities that are associated with a single selected logical entity of the set of at least two logical entities, and
      in the second transmission mode, the reception opportunities for the message correspond to combined reception opportunities associated with at least two logical entities of the set of at least two logical entities;
   (b) causing the transmission of the message during one of the reception opportunities corresponding to the selected transmission mode; and
   wherein the selection of the transmission mode is based on one or multiple of the following criteria: characteristics of the wireless device, number of logical entities on the wireless device, type of the wireless device, frequency of communication of logical entities, type of communicated information, urgency of delivery of the communicated information, a need for any sort of confirmation by the wireless device, applicability of the communicated information to one or more logical entities of the wireless device or entire wireless devices, desired reliability of the delivery, creating one or multiple message to be delivered, characteristics of the source node, source node type, source node ability to be a proxy, a number of source nodes paired to or communicating to a particular logical entity, exactness of knowledge about proxies, delivery success rate of previous transmissions, a relation between the transmission modes, policy for managing the buffered messages.

2. The method of claim 1, wherein steps (a) and (b) are carried out at a message source, wherein step (b) further comprises the message source sending a control message including an indicator to a dedicated proxy node dedicated to at least one logical entity of the set of logical entities, wherein the value of the indicator is set in accordance with the selected transmission mode, the method further comprising step (c) of the dedicated proxy node transmitting the message during one of the reception opportunities corresponding to the selected transmission mode.

3. The method of claim 2, wherein, if the message source is the dedicated proxy node, the sending of step (b) comprises sending the control message to a lower layer causing the transmission of the message at step (c) by the message source as the dedicated proxy node.

4. The method of claim 2, wherein the indicator is a logical entity identifier included in a logical entity identifier field of the control message to the dedicated proxy node, and wherein, if the first transmission mode is selected, the value of the indicator is equal to the logical entity identifier of the single selected logical entity, and wherein, if the second transmission mode is selected, the value of the indicator is a reserved predetermined identifier.

5. The method of claim 2, wherein the control message comprises a logical entity identifier field including a logical entity identifier, and a flag field including the indicator.

6. The method of claim 1, wherein, in the second transmission mode, the reception opportunities for the message correspond to the combined reception opportunities of all the logical entities of the wireless device.

7. The method of claim 1, wherein, in step (a), the selection of the transmission mode also includes the selection of a dedicated proxy node to carry out step (c) of transmitting the message to the wireless device.

8. The method of claim 1, wherein steps (a) and (b) are carried out at a proxy node transmitting the message to a wireless device,
wherein the step (a) of selecting a transmission mode is based on a detected value of an indicator in a received control message indicative of the selected transmission mode,
wherein the step (b) of causing the transmission of the message includes substeps
(b1) generating a message to be sent to the wireless device from the control message, and
(b2) transmitting the message to the wireless device based on the detected transmission mode,
where, in the first transmission mode, the reception opportunities for the message are limited to the reception opportunities associated with a single selected logical entity of the set of at least two logical entities, and
in the second transmission mode, the reception opportunities for the message correspond to combined reception opportunities associated with at least two logical entities.

9. The method of claim 8, wherein the control message further comprises a logical entity identifier field including a logical entity identifier, wherein if the logical entity identifier identifies one identified logical entity of the set, the first transmission mode is detected, and the selected single logical identifier is the identified logical entity, and wherein if the logical entity identifier field carries a reserved address, the second transmission mode detected.

10. The method of claim 8, comprising the step of the proxy node managing buffered messages of a transmission buffer based on the selected transmission mode.

11. A method for transmitting a message to a wireless device in a mesh network,
the wireless device comprising a set of at least two distinct logical entities, the wireless device being arranged for receiving a message during discontinuous reception opportunities,
the method comprising, prior to transmission of the message, the steps of
(a) selecting a transmission mode from a set of transmission modes comprising a first transmission mode and a second transmission mode, where,
in the first transmission mode, the reception opportunities for the message are limited to the reception opportunities that are associated with a single selected logical entity of the set of at least two logical entities, and
in the second transmission mode, the reception opportunities for the message correspond to combined reception opportunities associated with at least two logical entities of the set of at least two logical entities;
(b) causing the transmission of the message during one of the reception opportunities corresponding to the selected transmission mode; and
wherein the wireless device comprises at least one energy input for an energy harvester, wherein a reception opportunity occurs at a predetermined time instant after a transmission period, said transmission period being enabled at least in part by the harvesting of energy through said energy input, wherein said energy input is associated with a logical entity, and wherein said transmission period being triggered at least in part by the harvesting of energy through said energy input and said reception opportunities are associated with said logical entity.

12. A method for transmitting a message to a wireless device in a mesh network,
the wireless device comprising a set of at least two distinct logical entities, the wireless device being arranged for receiving a message during discontinuous reception opportunities,
the method comprising, prior to transmission of the message, the steps of
(a) selecting a transmission mode from a set of transmission modes comprising a first transmission mode and a second transmission mode, where,
in the first transmission mode, the reception opportunities for the message are limited to the reception opportunities that are associated with a single selected logical entity of the set of at least two logical entities, and
in the second transmission mode, the reception opportunities for the message correspond to combined reception opportunities associated with at least two logical entities of the set of at least two logical entities;
(b) causing the transmission of the message during one of the reception opportunities corresponding to the selected transmission mode; and
wherein the proxy node or the message source comprises a table storing information regarding the wireless device, where a single table entry denotes a number of logical entities of the wireless device, wherein the number is selected by the proxy node or the message source between one and the number of logical entities the wireless device.

13. A message source apparatus for causing the transmission of a message in a mesh network to a wireless device comprising a set of at least two distinct logical entities, the wireless device being arranged for receiving a message during discontinuous reception opportunities,
the message source apparatus comprising a controller adapted to select a transmission mode from a set of transmission modes comprising a first transmission mode and a second transmission mode, where,
in the first transmission mode, the reception opportunities for the message are limited to the reception opportunities that are associated with a single selected logical entity of the set of at least two logical entities, and
in the second transmission mode, the reception opportunities for the message correspond to combined reception opportunities associated with at least two logical entities of the set of at least two logical entities;

said controller being adapted to cause the transmission of the message during one of the reception opportunities corresponding to the selected transmission mode; and wherein the selection of the transmission mode is based on one or multiple of the following criteria: characteristics of the wireless device, number of logical entities on the wireless device, type of the wireless device, frequency of communication of logical entities, type of communicated information, urgency of delivery of the communicated information, a need for any sort of confirmation by the wireless device, applicability of the communicated information to one or more logical entities of the wireless device or entire wireless devices, desired reliability of the delivery, creating one or multiple message to be delivered, characteristics of the source node, source node type, source node ability to be a proxy, a number of source nodes paired to or communicating to a particular logical entity, exactness of knowledge about proxies, delivery success rate of previous transmissions, a relation between the transmission modes, policy for managing the buffered messages.

* * * * *